United States Patent
Perry et al.

(10) Patent No.: US 8,417,792 B2
(45) Date of Patent: Apr. 9, 2013

(54) ASYNCHRONOUS MESSAGING IN WEB SERVICES

(75) Inventors: Russell Perry, Bristol (GB); Neil MacDougall, Bristol (GB); David Murray Banks, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 2324 days.

(21) Appl. No.: 11/254,342

(22) Filed: Oct. 20, 2005

(65) Prior Publication Data

US 2006/0095576 A1    May 4, 2006

(30) Foreign Application Priority Data

Oct. 29, 2004   (GB) .................................. 0424124.6

(51) Int. Cl.
  *G06F 15/16*  (2006.01)
  *G06F 15/177*  (2006.01)
  *G06F 3/00*  (2006.01)

(52) U.S. Cl.
  USPC ........... 709/218; 709/202; 709/219; 709/222; 719/313; 719/330

(58) Field of Classification Search .................. 709/218, 709/202, 219, 222; 719/313, 330
  See application file for complete search history.

(56) References Cited

U.S. PATENT DOCUMENTS

| | | | | |
|---|---|---|---|---|
| 2003/0110242 | A1* | 6/2003 | Brown et al. | 709/222 |
| 2004/0117199 | A1* | 6/2004 | Fremantle et al. | 705/1 |
| 2004/0143645 | A1* | 7/2004 | Cheenath | 709/218 |
| 2004/0205765 | A1 | 10/2004 | Beringer | |
| 2006/0031850 | A1* | 2/2006 | Falter et al. | 719/320 |

OTHER PUBLICATIONS

Ryman, A., "Understand Web Services and Websphere: The rise of the Service Web", Developer Works Journal, Nov. 2003, pp. 22-26.
Erl, Thomas, "Introduction to Web Services Technologies", Prentice Hall PTR, Sep. 2004, pp. 66-71.
"Web Services Description Language (WSDL) Version 2.0 Part 3: Bidnings", Aug. 3, 2004. www.w3.or/TR/2004/WD~wsdl20~bindings~20040803.

* cited by examiner

*Primary Examiner* — Peter Shaw

(57) ABSTRACT

A method of invoking a service of a Web service provider using a client terminal comprises obtaining a template WSDL binding definition, communicating with the Web service to request the generation of a concrete WSDL binding and invoking the Web service using the concrete WSDL binding. A method is also provided for a Web services provider to provide asynchronous callback messages to a client, as well as the client and Web server apparatus.

21 Claims, 4 Drawing Sheets

ASYNCHRONOUS MESSAGING IN WEB SERVICES

FIELD OF THE INVENTION

This invention relates to Web services, and in particular the capability of providing asynchronous messaging, particularly asynchronous callback messages, in Web service applications. The invention relates to methods operated at the client terminal and at the Web server, and the corresponding computer software. The invention also relates to the client terminal and Web server hardware.

BACKGROUND OF THE INVENTION

A Web service is a software application can that be accessed remotely (namely over the Web), and using an XML-based language. A Web Service can be identified by a URI (universal resource indicator) in the same way as a conventional web site, or more typically will be accessed from some registry of web services.

A Web service program provides XML documents which are typically formatted in accordance with the rules of the SOAP specification. SOAP is essentially a message format which is not bound to any hardware or software architecture. The underlying transport mechanism is typically HTTP, although other transport protocols such as JMS or SMTP may be used. The Web Services Invocation Framework (http://ws.apache.org/wsif/) provides software components to aid in the use of different protocols and/or web service implementations.

The aim of the protocols established relating to Web services is to provide interoperability between different computer systems, running different languages on different operating systems. This facilitates the implementation of distributed computer systems. This is in a large part due to the ubiquity of its use of XML (Extensible Markup Language).

The established Web-based communications protocols are designed to enable text and image documents to be transmitted (namely Web pages), and essentially provide simple object access protocols.

In order to enable software applications to be described using a specification that is again independent of programming language and operating system, the Web Services Description Language (WSDL) has been devised. The specifications are available from the W3C web site (http://www.w3c.org/2002/ws/). This language is again based on XML, and provides a platform for the information needed to connect to a remote Web service. A WSDL document can be treated as two related but logically distinct sections: the abstract description which describes the functional behaviour of the web service; and the binding which describes how messages should be serialized onto some underlying protocol to send to the Web Service.

The binding description provides elements enabling the binding of a client to the Web service physically, namely the path and port connections. In the following description, the binding as currently used is referred to as "concrete" because it defines exactly all the connection information required for a client to immediately interact with a web service.

The abstract description provides elements describing the capabilities of the Web service, namely describing the Web service functionality. This essentially describes the input and output message formats that each web service operation accepts and generates respectively.

The binding essentially describes how the methods belonging to the abstract description can be invoked using common protocols like HTTP. Invocation of a method involves the submission of a message and usually a response message is received. When the response is received by a service directly in response to a request from a client, such an interaction is referred to as synchronous. When the response is not returned directly, but is delivered by the service using an agreed operation provided by the client, the interaction is regarded as being asynchronous. Usually, the asynchronous callback occurs some while after the original request. The 'agreed' operation is usually referred to as a callback method or function.

Another common interaction pattern in computer science is the listener pattern. This uses a callback method as in asynchronous interaction. However, instead of sending a request to the service, the client simply indicates its interest in receiving events produced by the service. The callback methods/operation is used by the service to send these events to the client. The events in this case are generated independently of the client rather than in response to a client request.

One limitation to Web services derives from the use of Web-based communications protocols. For example, the transport layer is typically HTTP. HTTP was designed to allow one server to handle hundreds of requests quickly, by not maintaining a long-term connection between the clients and server. A server will typically not maintain any state information to keep track from one user request to the next, so that the handling of multiple requests can be handled efficiently. Furthermore, HTTP inherently uses a synchronous form of interaction.

This transactional nature of Web based protocols such as HTTP has some incompatibility with asynchronous messaging.

Asynchronous messaging is a key element to the development of distributed computer systems. Asynchronous messaging enables the decoupling of a client from a server, so that a client program can request a service from the server, and continue with local processing tasks while the server response is awaited. Asynchronous messaging does not require any synchronisation of the data exchange and no permanent connection between client and server needs to be maintained.

Asynchronous callbacks involve calling a remote function provided by a Web service which is in response to an event not initiated by the Web service client. Simplistically, a callback is a method or function provided by a software component that allows another component to notify that an activity, requested some time ago, has completed. When a client invokes a method on a remote service the response message needs to be delivered to some callback address implemented by the client that originally invoked the method. Support for callback methods is necessary to support asynchronous messaging in general.

Asynchronous callbacks may be provided to give update information of many different types, for example in connection with stock or other prices, in connection with the status of a processing operation at the Web service etc.

The WSDL structure implies a support for asynchronous callbacks, but in practice it is not possible to support asynchronous callbacks using WSDL. In particular, WSDL does not provide a facility for defining the binding (part of the concrete description of the WSDL document) ahead of runtime. This prevents the implementation of asynchronous callbacks, because the callback address is unknown until runtime. In addition, there can be many potential clients and therefore many potential callback addresses.

New Web Service related specifications are continually being introduced, typically created to provide support for additional functionality. However, these additional specifications introduce further complexity and may potentially hinder the acceptance of Web services technology by introducing interoperability difficulties. They also limit the choice of protocol mechanism, most typically supporting only SOAP (Simple Object Access Protocol). Several of these specifications are under development within the World Wide Web Consortium (www.w3c.org) and OASIS (Organization for the Advancement of Structured Information Standards at http://www.oasis-open.org/home/index.php).

SUMMARY OF THE INVENTION

According to a first aspect of the invention, there is provided a method of invoking a service of a Web service provider using a client terminal, comprising:
  obtaining a template WSDL binding definition;
  communicating with the Web service to request the generation of a concrete WSDL binding;
  invoking the Web service using the concrete WSDL binding.

According to a second aspect of the invention, there is provided a method of providing asynchronous callback messages to a client using the server of Web service provider, comprising:
  receiving from a client terminal a request for a WSDL concrete binding on the basis of information derived from a template WSDL binding provided by the Web service provider;
  generating a concrete WSDL binding;
  providing the concrete WSDL binding to the client terminal; and
  in response to a request based on the concrete WSDL binding, providing asynchronous callbacks to the client terminal.

According to a third aspect of the invention, there is provided a server for a Web service provider, comprising:
  a Web server for receiving messages from the Internet and hosting a web site;
  a messaging engine;
  a binding setup interface for:
    receiving a request for a concrete binding from a client, the request including parameters set by the client; and
    generating a concrete WSDL binding for return to the client; and
  a processor for implementing a web service in response to invocation based on the concrete binding.

According to a fourth aspect of the invention, there is provided a client terminal adapted to invoke a service operated by a Web service provider, comprising:
  a Web browser for communication over the Internet;
  a message generator and message parser;
  an interface for:
    obtaining a template WSDL binding definition;
    communicating with the Web service provider using the template WSDL binding to request generation by the Web service provider of a WSDL concrete binding;
    receiving a WSDL concrete binding from the Web service provider; and
    invoking the Web service based on the concrete WSDL binding.

The invention also provides a computer program and storage device for the methods of the invention.

BRIEF DESCRIPTION OF THE DRAWINGS

An example of the invention will now be described in detail with reference to the accompanying drawings, in which.

DETAILED DESCRIPTION

Figure 1:
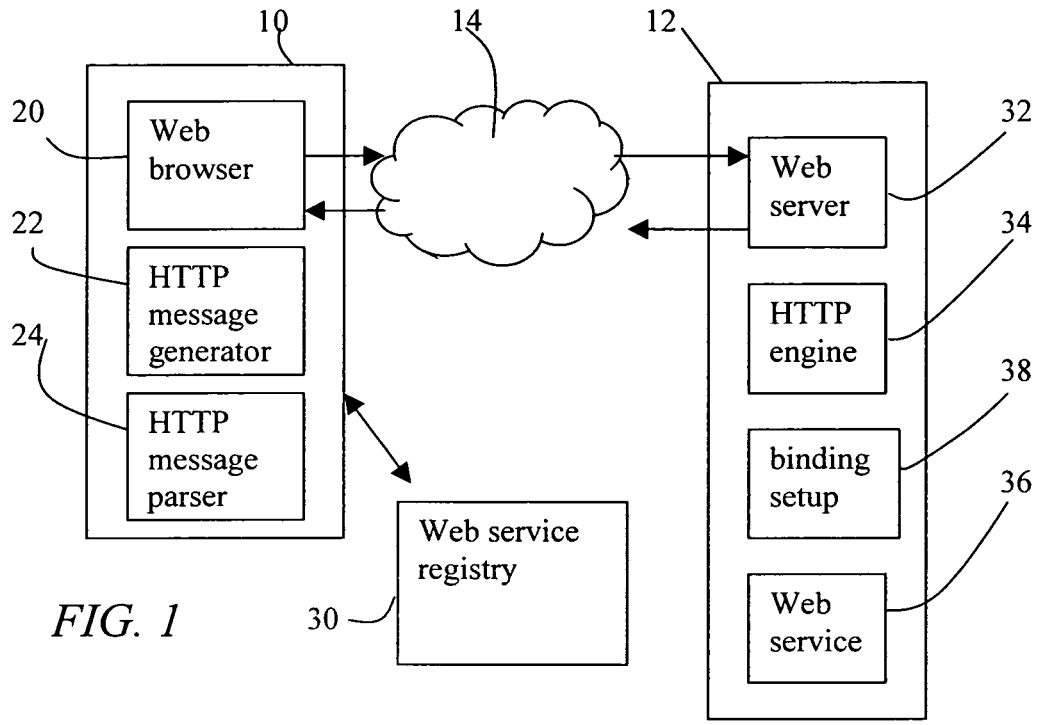
FIG. 1 shows a distributed computer system comprising a web server and a client terminal in accordance with an example of the invention.

FIG. 1 shows a distributed computer system of one embodiment of invention. Conventional hardware can be used to implement this embodiment of the invention. In FIG. 1, a client terminal 10 is used to invoke a Web service from a Web service provider 12 over the internet 14.

The client terminal 10 comprises a Web Application (e.g. a Web browser) 20 for communication over the Internet 14, an HTTP message generator 22 and HTTP message parser 24. This client terminal can thus be implemented with conventional hardware for a client terminal which is adapted to operate Web services. The client terminal 10 is adapted to obtain a template WSDL binding definition, and in the example shown in FIG. 1, this is by means of an interface with a Web services registry 30.

The service provider 12 has a Web server 32 for receiving messages from the Internet and hosting a web site, an HTTP engine 34 and a processor 36 for implementing a web service. A binding setup interface 38 is provided which is for receiving a request for a concrete binding from a client, and generating a concrete WSDL binding for return to the client.

This embodiment of the invention thus provides a method and apparatus in which the service of a Web service provider is invoked to allow asynchronous callbacks. A template WSDL binding definition is provided, and is for example stored in a Web services registry. An alternative binding description is thus proposed in the form of a "template" binding where the binding is only partially defined. A concrete binding is derived from the template binding during runtime.

Using this template binding definition, a client can communicate with the Web service in order to request the generation of a full concrete WSDL binding (but without invoking the Web service at this time). The Web service can then be invoked using the full concrete WSDL binding. The architecture can simply build on top of WSDL to provide improved capability without building a completely new specification which is much more complex.

A binding setup protocol is provided for dynamically generating a WSDL binding. This allows a client to specify a callback address to receive an asynchronous response message. The approach is lightweight and can work in conjunction with the existing WSDL specifications. In particular, the extensibility elements of the WSDL specification can be used to implement the invention.

In order to explain the method of the invention, an example will be given, including sections of WSDL code. The example used to illustrate the invention relates to a request for a stock price at some point in future. Sections of WSDL code are only given to illustrate the additional coding required to implement the invention. The example chosen builds on the example given in the W3C Note of 15 Mar. 2001 which is a submission to the World Wide Web Consortium describing Web Services Description Language (WSDL) version 1.1. This document is published at www.w3.org/TR/wsdl. Reference is made to this document for further details of the WSDL language, and for the other details (not relating to this invention) concerning the specific example used below.

The example of the invention described in detail below provides a binding setup protocol, which is essentially an overlay on top of WSDL as described above and in the W3C document referred to. The binding setup protocol uses WSDL binding descriptions to set up an interaction with a service. However, a partially complete binding definition is used to commence the client-server communications, and this will be referred to hereinafter as a "template binding". This "template binding" is used as the basis for a request for a "concrete binding", which is then referred to when invoking the Web service.

A "concrete binding" is any binding description which has service endpoints sufficiently well-defined that it can be used directly to invoke a service operation. For example an HTTP binding is a concrete binding. In contrast, the "template binding" is only partially specified, but provides sufficient information to enable a client to interact with the service to firm up the concrete binding description.

Typically, a template binding description will simply parameterise certain elements of a concrete binding description. The callback address can be partially defined in the WSDL abstract binding, for example it can specify that HTTP is used. The template binding can, in most other respects, be exactly like concrete bindings.

The concrete and template bindings are defined using WSDL as "types" of binding description. The process to obtain a concrete binding staring from a template binding defines the binding setup protocol of the invention.

An example of a template binding is given below using WSDL 1.1. WSDL allows the definition of new binding descriptions through its use of extensibility elements. Thus, the template bindings can be defined as extensions to WSDL 1.1. The system can be implemented by making extensive use of the HTTP protocol rather than SOAP, so that the implementation of the invention can be lightweight. Thus, in the example of the invention described in detail, a template HTTP binding is defined, as shown below:

```
<?xml version="1.0" encoding="utf-8"?>
<definitions name="StockQuote"
    targetNamespace ="http://example.com/stockquote .wsdl"
    xmlns:tns ="http://example.com/stockquote.wsdl "
    xmlns:xsd1 ="http://example.com/stockquote.xsd "
    xmlns:soap ="http://schemas.xmlsoap.org/wsdl/soap/"
    xmlns:ac =" http://example.hp.com/asynchronousCallback"
    xmlns ="http://schemas.xmlsoap.org/wsdl/ ">
<ac:type>TEMPLATE </ac:type>
<types>
    <schema   targetNamespace ="http://example.com/stockquote.xsd "
        xmlns="http://www.w3.org/2000/10/XMLSchema ">
    <element name="TradePriceRequest ">
        <complexType >
            <all>
                <element name="tickerSymbol " type="string"/>
            </all>
        </complexType >
    </element>
    <element name="TradePrice">
        <complexType >
            <all>
                <element name="price" type="float"/>
            </all>
```

```
        </complexType >
    </element>
    </schema>
</types>
<message name="GetLastTradePriceInput ">
    <part name="body" element ="TradePriceRequest "/>
</message>
<message name="GetLastTradePriceOutput ">
    <part name="body" element ="TradePrice"/>
</message>
<portType name="StockQuotePortType ">
    <operation name="GetLastTradePrice">
        <!-- Interface properties -->
        <ac:pattern >REQUEST-RESPONSE</ac:pattern>
        <ac:synchronicity >ASYNCHRONOUS </ac:synchronicity >
        <input message="tns:GetLastTradePriceInput "/>
        <output message ="tns:GetLastTradePriceOutput "/>
    </operation>
</portType>
<binding name="StockQuoteBinding " type="tns:StockQuotePortType ">
    <ac:type>TEMPLATE </ac:type>
    <ac:reliability >BEST-EFFORT</ac:reliability >
    <ac:durability>TRANSIENT </ac:durability>
    <ac:templateHttpBinding >
        <ac:operation name="GetLastTradePrice " >
            <ac:input  location ="http://www.abc.com/instance1"
                       verb ="POST">
                <mime:content type="text/xml"/>
            </ac:input>
            <ac:output   location ="http://$HOST:$PORT/$PATH "
                         verb="$VERB">
                <mime:content type="text/xml"/>
            </ac:output >
        </ac:operation >
    </ac:templateHttpBinding >
</binding>
<service name="StockQuoteService ">
    <port name="StockQuotePort " binding ="tns:StockQuoteBinding "/>
</service>
</definitions >
```

This code is based on the Request/Response via HTTP code given in the W3C document referred to above.

An additional name space, "http://example.hp.com/asynchronousCallback", is defined, and this is associated with the "TEMPLATE" binding definition in the <binding></binding> section of the code. In addition, several other elements are embedded in the document using the ac: prefix indicating that the elements relate to the "http://example.hp.com/asynchronousCallback" namespace. These are non-essential, but facilitate implementation.

This section of code defines the operation name "GetLastTradePrice", the input host details and the HTTP verb used to invoke the operation. It also specifies the undefined parameters which relate to the client host.

It can be seen to those skilled in the art that the template HTTP binding description is very similar to the concrete HTTP binding. In the template binding, a number of parameters are undefined, and these are indicated in this example by the use of the '$' character. The four parameters are shown below:

| | |
|---|---|
| $HOST | The name of the host to which the output should be sent. |
| $PORT | The port number to use to connect to the host $HOST. |
| $PATH | The relative path to use. |
| $VERB | Usually either GET or POST for HTTP. |

Not all parameters have to be left undefined in the binding description. The process by which a client defines the parameters forms the basis of the binding setup protocol, and amounts to the client specifying values for each of the parameters.

The template binding can also contain parameters that are set by the Web service provider, not the client. From the example above, the input message could be bound as follows:

```
<ac:input location ="http://£HOST:£PORT/£PATH " verb="POST">
   <mime:content type="text/xml"/>
</ac:input>
```

In this case, there are three parameters shown. These are:
£HOST
£PORT
£PATH

In this example, service-set parameters are indicated by the use of the '£' character. Usually, the choice of which party, either client or service, can set a parameter value is determined by whether a parameter relates to an input or output message.

In the example of the stock quote service, it is important that the server parameters are also used in order that a client request can be correlated with the eventual client callback. The service is able to do this because it maintains a mapping from the three service-selected parameters and the client-specified parameters. Thus, in this example the form of the input element containing the service parameters will be used in place of the concrete specification.

The binding setup protocol encompasses the process of requesting a binding description, determining whether a binding is concrete or template and, if template, generating a concrete binding. If the binding description is concrete, then the binding setup protocol reduces to a simple binding description request and service invocation. This fits neatly within existing usage patterns for WSDL.

This simplification is attractive as only if a binding is template, an additional interaction is required to generate the concrete binding.

Figure 2:
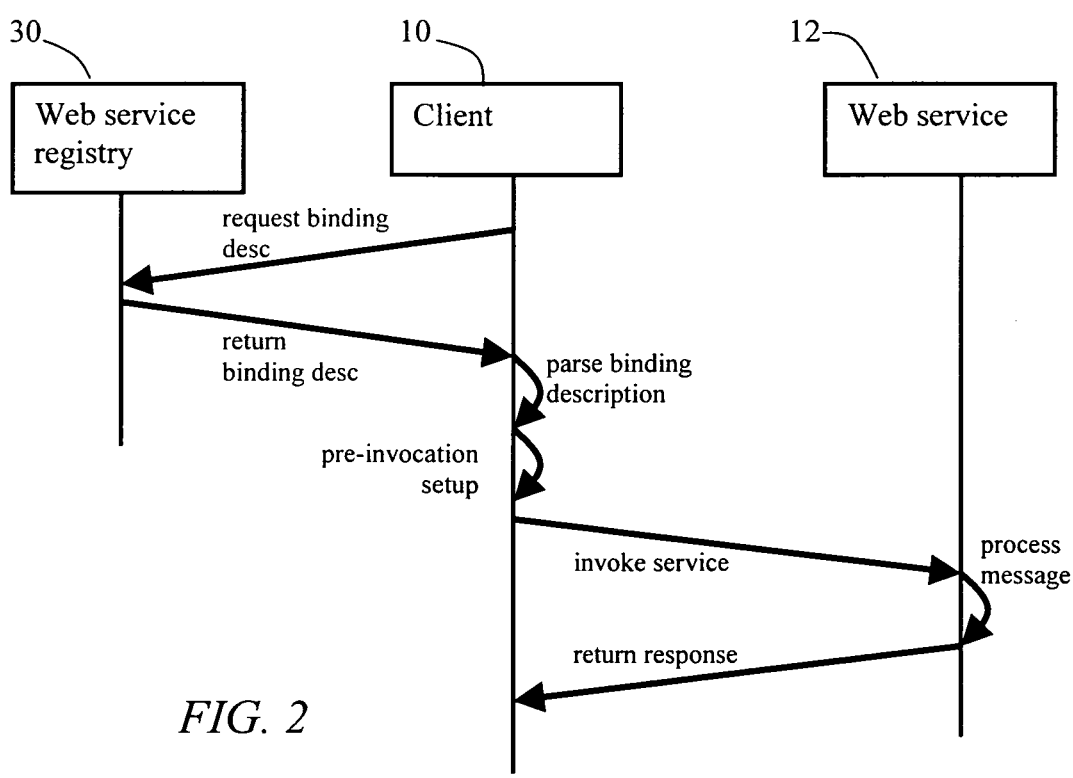
FIG. 2 shows one possible process for invoking a web service using the system of FIG. 1.

FIG. 2 is used to explain how a Web service can be invoked using the system of this embodiment of the invention if asynchronous callbacks are not required. It can be seen that the system of this embodiment of the invention does not require significant alteration to the conventional Web service invocation method if asynchronous callbacks are not required.

Initially, the client obtains a binding description document from the Service Registry 30, having previously discovered the service identifier for the service it wishes to invoke. The Web Service Registry contains a list of all the accessible services and their interfaces.

The binding description can be cached and so this request only needs to be performed once unless the binding expires. The binding may have an expiry time which the client must comply with.

After receipt of the binding description, it is parsed, and the client in this example determines that it is concrete from the binding type property. The fact that the binding is concrete indicates that the associated Web service is not one which requires implementation of asynchronous callbacks. As a result, the Web service is ready to be invoked, in conventional manner, using the concrete binding.

The binding setup protocol shown in FIG. 2 also includes a pre-invocation setup step. During this step, the client must determine whether it needs to setup any bindings before it invokes the service. This is most typically required for the template bindings explained with reference to FIG. 3, which describes an embodiment of the invention. In particular, to support asynchronous messaging the client will have to implement a "callback" endpoint before it invokes the operation.

For a Web service which does not require asynchronous callbacks, the pre-invocation setup will typically not require any additional operation steps, so that the system of this embodiment of the invention does not add complexity to the invocation of Web services to be provided over a synchronous communications link.

After completing any required setup operations, the client can now invoke the service operation using the concrete binding. This completes the binding setup protocol for a concrete binding description.

The binding setup protocol for a template binding is described with reference to FIG. 3, and this explains the binding setup protocol of this example of the invention. As before, the client 10 obtains a binding description document from the Service Registry 30 unless it already has a cached copy that has not expired. The client may also check to see if it has a concrete binding derived from the template binding that it may use. Assuming that it does not, the client obtains a concrete binding from the service in the manner explained below.

To do this, the client interacts with the Web service Binding Setup Interface 38. This interface 38 is a mandatory interface that all services must support if they advertise template bindings.

The host and port details for this Binding Setup Interface are provided by the Web service provider to the Web services registry, and this interface is established specifically for the negotiation of concrete bindings.

Figure 4:
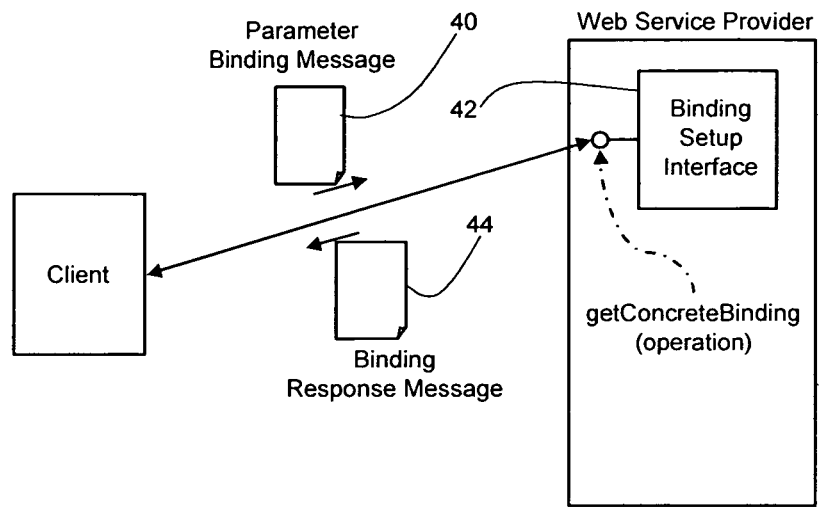
FIG. 4 shows in greater detail the binding setup interface of FIG. 3.

The interface contains the operation of generating a "Binding-Response-Message" in response to a "getConcreteBinding" request. This is illustrated in FIG. 4, which shows a parameter binding message 40 sent from the client to the web service provider to a binding setup interface 42 of the web service provider. A binding response message 44 is returned to the client.

Figure 3:
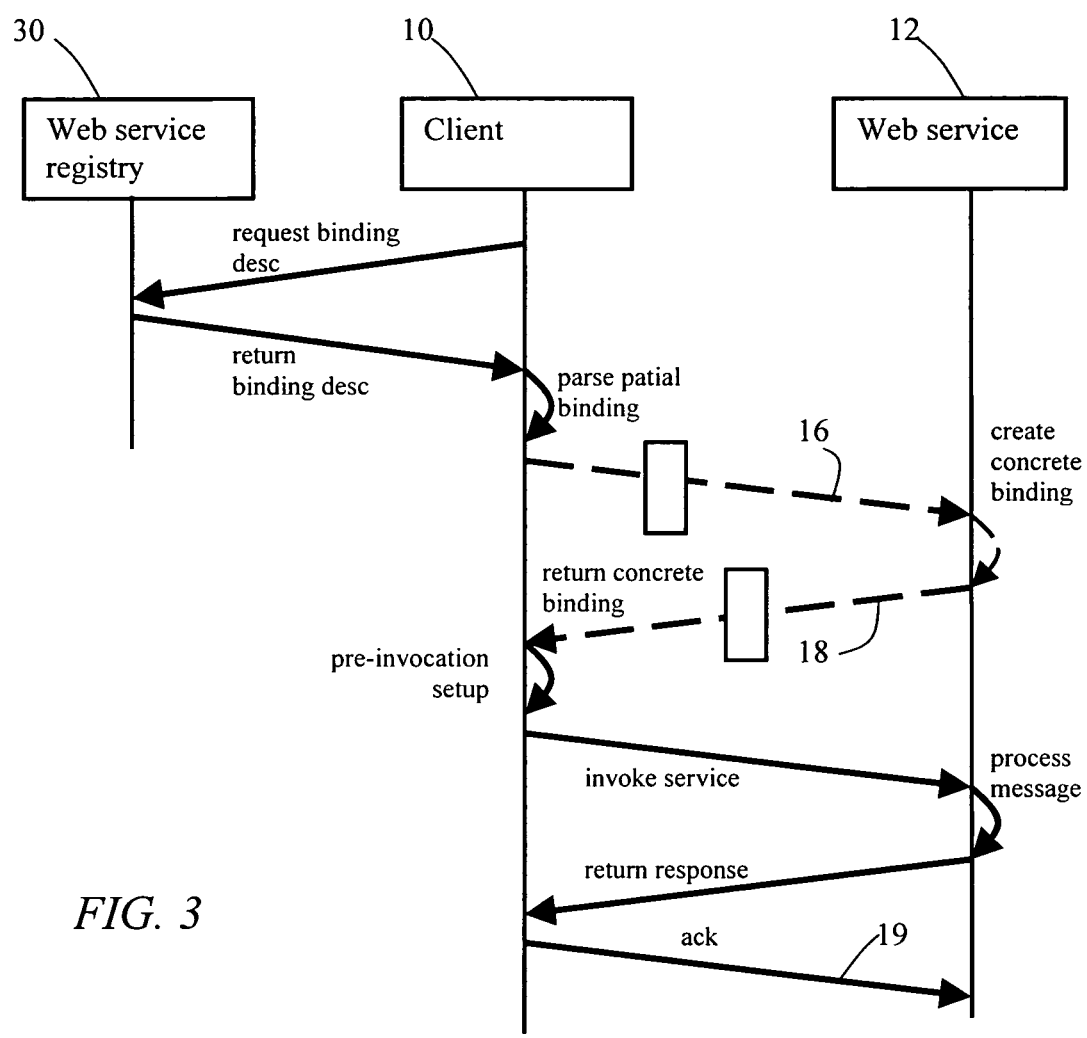
FIG. 3 shows a process for invoking a web service in accordance with an example of the invention, again using the system of FIG. 1.

This request for a concrete binding, invoked by the client by sending the request, is also represented by arrow 16 in FIG. 3.

The Binding-Response-Message 44 is simply a container document which either contains a concrete binding description or an error description, in response to the Parameter Binding Message request. With reference to the template HTTP binding shown above, an example Parameter Binding Message would be:

```
<?xml version="1.0"?>
<bindingParams
    WSDLName= "http://hp.com/StockQuoteServiceWSDL"
      <port name="StockQuotePort" binding=StockQuoteBinding>
         <operation name=GetLastTradePrice>
            <param name="$HOST" value="foo.bar.com"/>
            <param name="$PORT" value="8081"/>
            <param name="$PATH" value="/callback"/>
            <param name="$VERB" value="POST"/>
         </operation>
      </port>
</bindingParams >
```

Namespaces have been omitted for simplicity. The root element "bindingParams" contains three important attributes: The "WSDLName" references the WSDL document stored at the Web services registry, namely the WSDL document above which defines the template binding. The "operation" attribute enables one of many different operations to be selected. In the example given, there is only one operation outlined, which is the "GetLastTradePrice" operation, but the Web services provider may host many different operations. The "binding" attribute references the binding description to which this binding request relates (there may be more than one binding description in the WSDL document stored at the Web services registry). The Binding-Response-Message would contain values for all template bindings.

Because the form of the parameterisation of a template binding depends on the binding description type, the "bindingParams" element can contain any valid XML. In this example, the protocol parameters are transferred as a set of name-value pairs for each operation for which a concrete binding is needed.

The concrete binding description generated by the Web service and sent back to the client within the Binding-Response-Message is also shown in FIG. 3, represented by arrow 18.

Figure 5:
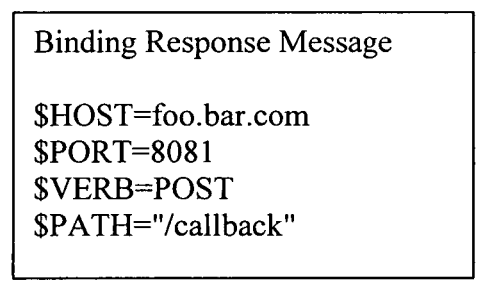
FIG. 5 shows the content of a message used in the method shown in FIG. 3.

FIG. 5 shows schematically an example of the relevant content for the Binding-Response-Message, and which confirms that a concrete binding has been established with the indicated parameters.

The set of parameter values, implicitly agreed to by the presence of a WSDL contained in the Binding-Response-Message, enables the concrete binding created by the Web services registry to be referenced. In the example, the four parameter values for the client $HOST, $PORT, $PATH and $VERB and the three parameters for the service £HOST, £PORT and £PATH define a unique WSDL concrete binding between the client and server. The concrete binding may be for an operation which is unique to the client and server (namely client and server parameterised) or it may be for an operation for multiple clients (namely client parameterised only). For example, an identical service may be provided to multiple clients such as a notification service, or else a service may be tailored to a specific client. The information contained in the Binding-Response-Message enables the concrete binding, which is stored at the Web service, to be identified when the service is subsequently invoked. The Binding-Response-Message contains a serialization of the concrete binding description, for example the serialization can be a WSDL document.

If no concrete binding can be created then the message will be marked failed with an explanation to indicate the reason for failure.

For example, the Web server may be set up only to provide asynchronous callbacks to "partner" IP addresses, and the binding setup interface in this way can implement an authorisation operation. There may be other restrictions such as the range of port types a service can connect to because of firewall restrictions. There may also be technical failures which prevent the generation of the concrete binding.

A lifetime parameter value can also be set up defining a time for which the concrete binding will be valid. This can be proposed by the client and accepted by the service if reasonable. By agreeing a WSDL concrete binding in this way, both client and service have a convenient means (WSDL format) to serialise the service interface. If a service is restarted, it can then resume delivery of asynchronous messages to the client. Similarly the client can setup to receive asynchronous callbacks (provided the WSDL has not expired) after it also restarts.

The measures above make it possible to make use of existing web service middleware components even for the template bindings. The concrete binding returned contains an HTTP binding and a service element (excerpts from the full WSDL) as shown below:

```
<binding name="StockQuoteBinding " type="tns:StockQuotePortType ">
   <ac:type>CONCRETE</ac:type>
   <ac:expiry>STATIC</ac:expiry>
   <http:binding verb="POST"/>
   <operation name=" GetLastTradePrice ">
      <http:operation location="/client/123"/>
      <input>
         <mime:content type="text/xml"/>
      </input>
      <output>
         <mime:content type="text/xml"/>
      </output>
   </operation>
</binding>
<service name="StockQuoteService ">
   <port name="StockQuotePort " binding="tns:StockQuoteBinding ">
      <http:address location ="http://www.hp.com/:8082 "/>
   </port>
</service>
```

The client can then invoke the service operation getLastTradePrice using the newly created concrete binding. This completes the binding setup protocol for template bindings.

To invoke the service, the client sends an HTTP POST to the address http://www.hp.com:8082/client/123. The body of the POST request contains an XML document of the form:

```
<?xml version="1.0" encoding="utf-8"?>
<TradePriceRequest>
   <tickerSymbol>XYZ</tickerSymbol>
</TradePriceRequest>
```

The service is able to correlate the parameter values £PATH=/client/123 £HOST=www.hp.com and £PORT=8082 with the set of client parameters specified in the Parameter-Binding-Message. Thus upon completion of the operation, the response would be returned to the client by sending an HTTP POST to the address http://foo.bar.com:8081/callback. The body of the HTTP POST contains an XML message of the form:

```
<?xml version="1.0" encoding="utf-8"?>
<TradePrice>
   <price>24.75</price>
</TradePrice>
```

FIG. 3 shows an optional acknowledgement message 19. If no acknowledgement message is received by the Web service after providing a callback function, the concrete binding may be declare null and void. Different operations may be set up by the Web service in response to a lack of acknowledgement, for example multiple delivery attempts may be made before declaring a concrete binding void.

A concrete binding can continue to be used by the client in subsequent requests. Thus, the overhead of creating a concrete binding is generally incurred only once when the client first interacts with the service. However anticipating certain services may be resource-constrained, it is allowable for a service to limit the concrete binding lifetime by specifying an expiry time or defining the instance to be useable only once.

Any service supporting the Binding-Setup-Interface must specify a concrete binding description, otherwise there would be no way of boot-strapping the binding setup protocol.

The pre-invocation step is mentioned briefly above. In the case of an asynchronous interaction, an operation with a defined input message is said to have been invoked when that input message have been received by the service implementing the operation. In the case of an operation that has no input message, i.e. an event notification type operation, the moment of invocation is defined when a concrete binding has been sent to the client. Thus, the service producing the events will begin delivering messages to a client as soon as a concrete binding has been sent to the client.

The precise 'moment of invocation' becomes important when the service will callback to the client at some indeterminate future time. Critically, this could be very soon after the request is recived or an event is to be distributed to a set of listeners. Because the client will not know exactly when this will occur, it must guarantee that it has set up the required client-side protocol listeners in order to receive callbacks, event notifications or exceptions, before it invokes the operation requesting the concrete binding. For example, timing irregularities as a result of multi-thread processing could cause a callback message to be sent to the client before the client has completed the setup process.

These protocol listeners are of course only required in the event of successful creation of a concrete binding. If it fails the client will have to free any resources it has setup.

Figure 6:
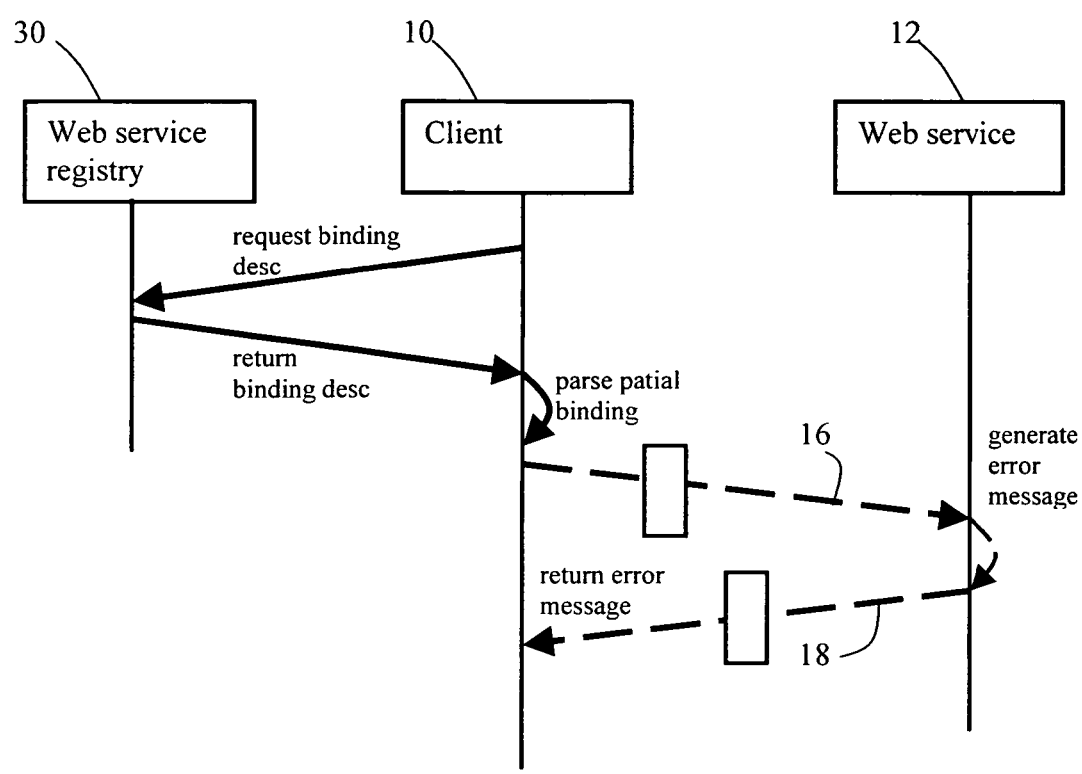
FIG. 6 shows failure or refusal to generate a concrete binding within the method of FIG. 3.

For completeness, FIG. 6 shows the situation in which a request for a concrete binding is refused. The same reference numbers are used as in FIG. 3, and in this case, the message 18 is an error message indicating the reason for the failure to create a concrete binding.

The pre-invocation setup procedure is also relevant to the handling of exceptions. In some cases, an exception message will be sent in place of a response message in the event of a failure. This is referred to here as response substitution and is the default behaviour if no explicit exception message binding is specified in a binding description. However, if an exception message binding is specified, then it is necessary for the client to establish a listener for the exception message, should an error occur. This should take place during the pre-invocation setup phase.

It will be seen that the example of the invention described in detail above provides an architecture which supports client-side bindings and asynchronous callbacks. At present, a service may offer a notification operation, but since it is not known in advance which clients will request event notifications, it is impossible to specify a concrete binding description during deployment. The template bindings enable binding descriptions to be deferred until runtime and to be defined by the client and not just the service. Therefore, a client can define information such as an HTTP URL to which notifications can be posted. The service uses the template bindings to guide the client as to which protocols it can support for message delivery.

The template bindings can also be used to establish unique concrete binding descriptions on a client-by-client basis. This can provide a means to model sessions between a client and a service or to load balance. In this usage pattern, a parameterised template binding is provided by a service, but the parameters are defined to be set by the service rather than the client. In the load-balancing example, a service may provide bindings to two different hosts, which it assigns in a round-robin fashion every time a client requests a concrete binding.

The example of the invention described above does not require the client and service to negotiate the concrete binding in an interactive manner. This could be too heavy weight and offer little obvious value. The template binding can declare the possible protocols a service can provide and it is the client's responsibility to select one of them and specify appropriate details. If a protocol is not defined, then it will not be supported.

An example of the invention has been described above using WSDL code and using one example of asynchronous message. It will be understood that the invention can implemented using SOAP bindings rather than HTTP bindings, and indeed that the HTTP protocol is not an essential element of the invention.

The concrete binding description in the example above is transmitted from the Web server to the client terminal as a WSDL document. However, this is not essential, and other data formats can be used for conveying the information enabling the concrete binding to be derived. The Web service is then subsequently invoked using WSDL using the derived concrete binding. In addition, although this invention is illustrated in conjunction with WSDL 1.1 the technique is suitable for use in conjunction with a proposed later version.

The approach used in the example above avoids "contaminating" application level messages with the underlying transport mechanisms used to setup the binding. This avoids the need for transport level information inside the application message, and thereby avoids the application to have to deal with such information.

The HTTP binding used in the example above can be replaced with HTTPS which allows secure interaction between the client and server.

Various other modifications will be apparent to those of ordinary skill in the art.

We claim:

1. A method of invoking a service of a Web service provider using a client terminal, comprising:
    obtaining a template WSDL binding definition, the template WDSL binding definition specifying how the client terminal can request a generation of a concrete WDSL binding, the template WDSL binding further specifying at least one server parameter, the at least one server parameter being undefined in the template WDSL binding and including at least one of a host, port, and a path of a Web server;
    communicating with the Web server to request the generation of the concrete WSDL binding, the concrete WSDL binding defining the at least one server parameter, the at least one server parameter defining a Web server;
    transmitting a parameter binding message to the Web server, the parameter binding message defining a plurality of client parameters, the client parameters including a client verb identification and at least one of a client host, a client port, and a client path;
    invoking the Web service using the concrete WSDL binding, the Web service being invoked on the Web server by the client terminal; and
    returning data from invocation of the Web service to the client terminal by performing a callback operation on the client terminal described by the verb identification.

2. The method as claimed in claim 1, wherein the step of obtaining the template WSDL binding definition comprises communicating with a Web services registry.

3. The method as claimed in claim 1, wherein the template WSDL binding defines parameters set by the Web service provider, and does not define parameters set by the client terminal.

4. The method as claimed in claim 1, wherein the client verb identification is a hypertext transfer protocol method executable on the client terminal by the Web server, the hypertext transfer protocol method being at least one of a POST, GET, PUT, TRACE, and HEAD.

5. The method as claimed in claim 1, wherein the template WSDL binding definition is defined as a WSDL bindings extensibility element.

6. The method as claimed in claim 1, wherein before requesting generation by the Web service provider of the concrete WSDL binding, the client terminal sets up client side protocol listeners for receiving callbacks.

7. A computer program, stored on a computer readable medium and executable on a client terminal that implements the method as claimed in claim 1.

8. A method of providing asynchronous callback messages to a client terminal from a server, comprising:
  receiving from the client terminal a request for a concrete WSDL binding on the basis of information derived from a template WSDL binding, the concrete WSDL binding defining at least one server parameter, the at least one server parameter including at least one of a host, port, and a path of the server and the template WDSL binding specifying how the client terminal can request a generation of the concrete WDSL binding;
  generating the concrete WSDL binding;
  providing the concrete WSDL binding to the client terminal;
  receiving a parameter binding message from the client terminal, the parameter binding message defining a plurality of client parameters including a client verb identification and at least one of a client host, a client port, and a client path; and
  in response to a request based on the concrete WSDL binding, providing asynchronous callbacks to the client terminal, the client terminal addressable by the server using the client parameters.

9. The method as claimed in claim 8, wherein the template WSDL binding defines parameters set by the server, and does not define parameters set by the client terminal.

10. The method as claimed in claim 8, wherein the client verb identification is a hypertext transfer protocol method executable on the client terminal by the server, the hypertext transfer protocol method being at least one of a POST, GET, PUT, TRACE, and HEAD.

11. The method as claimed in claim 8, wherein the template WSDL binding definition is defined as a WSDL bindings extensibility element.

12. The method as claimed in claim 8, wherein the template WSDL binding is published in a Web service registry.

13. A computer program, stored on a computer readable medium and executable on a client terminal that implements the method as claimed in claim 8.

14. A system, comprising:
  a server configured to receive messages from the Internet and hosting a web site;
  a binding setup interface configured on the server, the binding setup interface configured to perform the steps of:
    receiving a request for a concrete WSDL binding from a client, the request derived from a template WSDL binding and including parameters set by the client, the parameters set by the client include at least one of a client host name, client port, client path, and client verb identification with which the server can execute a callback function on the client; and
    generating a concrete WSDL binding for return to the client, the concrete WSDL binding defining at least one server parameter, the at least one server parameter including at least one of a host, port, and a path of the server, the at least one server parameter further specifying how a Web service can be invoked on the server by the client; and
  a processor for implementing the Web service in response to invocation based on the concrete WDSL binding.

15. The system as claimed in claim 14, wherein the client verb identification is a hypertext transfer protocol method executable on the client by the server, the hypertext transfer protocol method being at least one of a POST, GET, PUT, TRACE, and HEAD.

16. A distributed computer system comprising:
  the system as claimed in claim 14; and
  a plurality of client terminals, each client terminal comprising:
    a Web browser for communication over the Internet;
    a message generator and message parser;
    an interface for:
      obtaining the template WSDL binding definition;
      communicating with the Web service provider using the template WSDL binding to request generation by the Web service provider of the WSDL concrete binding;
      receiving the concrete WSDL binding from the Web service provider; and
      invoking the Web service based on the concrete WSDL binding.

17. A client terminal adapted to invoke a service operated by a server, comprising:
  a Web browser for communication over the Internet;
  a message generator and message parser;
  an interface for:
    obtaining a template WSDL binding definition, the template WDSL binding definition specifying how the client terminal can request a generation of a concrete WDSL binding, the template WDSL binding further specifying at least one server parameter, the at least one server parameter being undefined in the template WDSL binding and including at least one of a host, port, and a path of the server;
    transmitting to the server a plurality of client parameters specifying how a callback operation can be executed on the client by the server, the plurality of client parameters including a client verb identification and at least one of a client host, a client port, and a client path;
    communicating with the server using the template WSDL binding to request generation by the server of a concrete WSDL binding, the concrete WSDL binding defining at least one server parameter, the at least one server parameter including at least one of a host, port, and a path of the server, the at least one server parameter further specifying how a web service can be invoked on the server;
    receiving the concrete WSDL binding from the Web service provider; and
    invoking the Web service based on the concrete WSDL binding.

18. The client terminal of claim 17, wherein the interface is adapted to communicate with a Web services registry to obtain the template WSDL binding definition.

19. The client terminal as claimed in claim 17, wherein the client verb identification is a hypertext transfer protocol method executable on the client by the server, the hypertext transfer protocol method being at least one of a POST, GET, PUT, TRACE, and HEAD.

20. The client terminal of claim 17, wherein the template WSDL binding definition obtained by the interface is defined as a WSDL bindings extensibility element.

21. The client terminal as claimed in claim 17, further comprising client side protocol listeners for receiving callbacks, the client side listeners being addressable at the at least one client parameter.

* * * * *

UNITED STATES PATENT AND TRADEMARK OFFICE
CERTIFICATE OF CORRECTION

PATENT NO. : 8,417,792 B2
APPLICATION NO. : 11/254342
DATED : April 9, 2013
INVENTOR(S) : Russell Perry et al.

It is certified that error appears in the above-identified patent and that said Letters Patent is hereby corrected as shown below:

In the Claims

In column 12, line 34, in Claim 1, delete "WDSL" and insert -- WSDL --, therefor.

In column 12, line 35, in Claim 1, delete "WDSL" and insert -- WSDL --, therefor.

In column 12, line 36, in Claim 1, delete "WDSL" and insert -- WSDL --, therefor.

In column 12, line 38, in Claim 1, delete "WDSL" and insert -- WSDL --, therefor.

In column 13, line 19, in Claim 8, delete "WDSL" and insert -- WSDL --, therefor.

In column 13, line 21, in Claim 8, delete "WDSL" and insert -- WSDL --, therefor.

In column 14, line 5, in Claim 14, delete "WDSL" and insert -- WSDL --, therefor.

In column 14, line 35, in Claim 17, delete "WDSL" and insert -- WSDL --, therefor.

In column 14, line 37, in Claim 17, delete "WDSL binding," and insert -- WSDL binding, --, therefor.

In column 14, line 37, in Claim 17, delete "WDSL binding" and insert -- WSDL binding --, therefor.

In column 14, line 40, in Claim 17, delete "WDSL" and insert -- WSDL --, therefor.

Signed and Sealed this
First Day of December, 2015

Michelle K. Lee
*Director of the United States Patent and Trademark Office*